Figure 1:
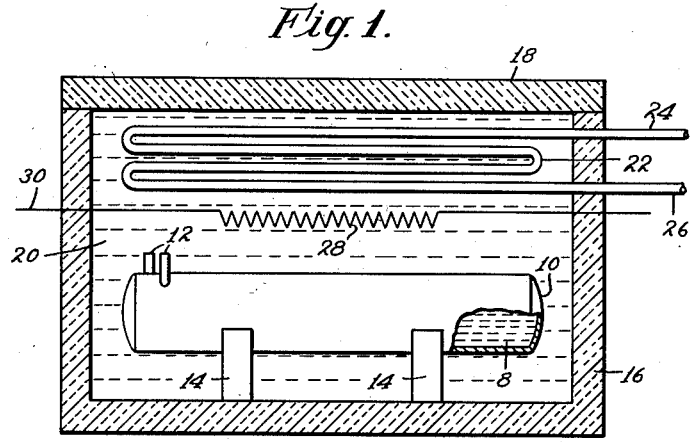

Jan. 22, 1952  H. F. MINTER ET AL  2,583,150
STYRENE-POLYESTER COPOLYMER FOR PHOTOELASTIC STUDIES
Filed Dec. 4, 1947

WITNESSES:
Edward M. Michaels
Wm. C. Groome

INVENTORS
Herbert F. Minter, Newton C. Foster
and Milton M. Leven.
BY
Frederick Shope
ATTORNEY Patented Jan. 22, 1952

2,583,150

UNITED STATES PATENT OFFICE 2,583,150

STYRENE-POLYESTER COPOLYMER FOR PHOTOELASTIC STUDIES

Herbert F. Minter, Newton C. Foster, and Milton M. Leven, Pittsburgh, Pa., assignors to Westinghouse Electric Corporation, East Pittsburgh, Pa., a corporation of Pennsylvania Application December 4, 1947, Serial No. 789,748

9 Claims. (Cl. 260—45.4)

This invention relates to a casting or polymerization process for producing large bodies of resin, and particularly resin bodies characterized by such homogeneity and isotropic properties that they are suitable for photoelastic studies.

The preparation of resin bodies for photoelastic studies imposes the most severe requirements known as to homogeneity and optical effects demanded of any known resin application. The bodies must be totally free from cracks, bubbles and voids. The bodies must be free from residual stresses. The bodies must be transparent to polarized light. The bodies must possess the property of birefringence, that is, the property of showing fringes when exposed to polarized light in direct proportion to the induced stresses. The resin bodies must not appear mottled when examined under polarized light. Other qualities required of photoelastic resin solids will be disclosed hereinafter and in our copending Patent Application Serial No. 789,749, filed simultaneously herewith, and now abandoned.

It is particularly desirable to secure the largest possible bodies for producing test members or models for three dimensional "frozen stress" photoelastic studies because the accuracy of the studies is proportional to the size of the members. In such studies the test member or model of a suitable material is subjected to loads while at an elevated temperature and cooled, while so loaded, to room temperature. The test member retains the imposed deformations when unloaded at room temperature as a fixed or "frozen" deformation. Thin slices can then be removed from the model and examined under polarized light. The deformations retained in each slice give rise to retardation or fringe patterns which enable a determination to be made of the distribution of stresses therein. Hitherto, the best available photoelastic materials could only be obtained in thicknesses of 1¼ inches, and it required about one year to polymerize resins to this thickness.

For making three-dimensional photoelastic frozen stress analysis studies, it is necessary that there be available bodies of a resinous material possessing the property of developing "frozen stress" fringes and of a size from which a suitable model of the member whose stresses are to be studied may be produced by machining. The material should possess the additional properties of transparency and homogeneity. The transparency is required so that polarizer light may pass through it. Homogeneity is critical since the stress distribution will obviously vary and no reliable conclusions can be derived from a material which is not homogeneous. The resinous members must be stable over the range of temperatures involved in the studies and, furthermore, should retain the stress distribution for long periods of time. From a practical viewpoint, the resinous material must be thermoset and, according to the present structural conceptions, possess a biphase structure composed of a rigid cell-like structure or skeleton of crosslinked molecules and a fusible or plastic resin disposed within the cells, since it has been found that only such structures are optically sensitive for the purpose of the invention. In order to enable reasonably accurate stress determinations to be secured from models made therefrom, the resinous composition must not only be optically sensitive, but, in addition, must exhibit a linear relationship between stress and the optical or birefringent effect under polarized light. It follows that the material should exhibit as great a number of fringes as possible for a given load since the greater the number of fringes, the more accurate and better the results that are obtained. The material must have the property of annealability, that is, it should be capable of producing after heat-treatment without load a body that exhibits substantially no fringes. Any internal or residual stresses should be removable readily and therefore should not be permanent.

In conducting frozen stress tests it is necessary to apply loads to the material while it is at an elevated temperature of from 80° C. to 120° C. The modulus of elasticity of resinous materials is reduced greatly at these temperatures—often to $1/700$ of the room temperature value. The fringe value also changes in going from room temperature to these elevated temperatures. Consequently, a given load will produce relatively large deformations at these elevated temperatures—of the order of 25 times those secured in room temperature tests.

In comparing materials for "frozen stress" analysis both the fringe value and modulus of elasticity must be considered. We have found the best indication of the comparative merits of various compositions is secured by dividing the modulus of elasticity by the fringe value at the elevated test temperature. This quotient is defined as the figure of merit, Q, as follows:

$$Q = \frac{\text{modulus of elasticity}}{\text{fringe value}}$$

One of the more difficult requirements of those mentioned herein is the preparation of relatively large bodies or pieces of the resinous composition so that relatively large models may be prepared therefrom. The larger the model, the more slices it may be cut into, and the more detailed and reliable the information that may be secured. Up to the present time, the largest size bodies of photoelastic resinous compositions that were available to the trade were approximately 1¼" in thickness, and even these required about one year's polymerization time to produce them. The length and width of these pieces also were limited to about one foot. The thinnest slices that can be practically secured or approximately ⅛" in thickness. The slices can be cut with not less than ⅛" inch waste per cut. A great many complex members, however, cannot be studied with satisfaction with material limiting the models to about one inch in thickness from which four slices are the most that can be secured. In some complex members, it would require a great number of slices, for example forty or fifty, to study satisfactorily the stress distribution. Accordingly, prior to the present invention, the ability to secure large pieces of resinous composition limited the application of three-dimensional photoelastic analysis.

Two advantages would accrue with the possibility of making larger models. First, more accurate and more intricate models may be made. Second, a slice of given thickness will have a more uniform stress distribution in the direction of its thickness when taken from a larger model than from a small model of the same member, and consequently the fringe pattern will be more indicative of the actual stresses at a given point when using larger models. Ordinarily a slice of about ⅛ inch is required to produce a sufficient fringe pattern to warrant reliable conclusions as to stresses. Thus in using a shaft model one inch in diameter, a longitudinal ⅛ inch slice is not sufficiently uniform to give a true stress indication since the stresses will vary considerably from point to point in the thickness of the slice and an inaccurate integrated fringe pattern results which may lead to serious error. A longitudinal ⅛ inch thick slice of a six inch diameter model is far more accurate for photoelastic analysis. Larger models permit a closer approach to the ideal condition in which stresses are determined for an infinitely thin section.

For a more detailed explanation of the making of photoelastic studies reference should be had to the article by M. Hetenyi entitled "The fundamentals of three-dimensional photoelasticity" on pages A149 to A155 of the December 1938 issue of the Journal of Applied Mechanics.

According to the present invention, a novel resinous composition is produced that enables the preparation of resinous solids of practically any size to be produced, for example, up to ten inches in diameter and several feet in length, the composition in addition possessing photoelastic characteristics superior to any known material, the figure of merit being from 50% to 100% greater than for any known material. Therefore, the most complex members may be modeled from the resinous composition and tested as exhaustively as desired with exceptionally accurate results being obtained. The composition has certain properties that are not possessed by those known to the art heretofore, as will be disclosed hereinafter.

The object of this invention is to provide a resinous composition that may be polymerized to a solid body of any predetermined size.

A further object of the invention is to provide solid resinous bodies which possess exceptional photoelastic properties for carrying out three-dimensional photoelastic analysis.

The object of this invention is to provide for polymerizing thermosettable liquids into large isotropic homogeneous bodies of resin.

A further object of this invention is to provide a process for producing in short periods of time large isotropic homogeneous bodies of resin suitable for photoelastic and other studies.

Figure 2:
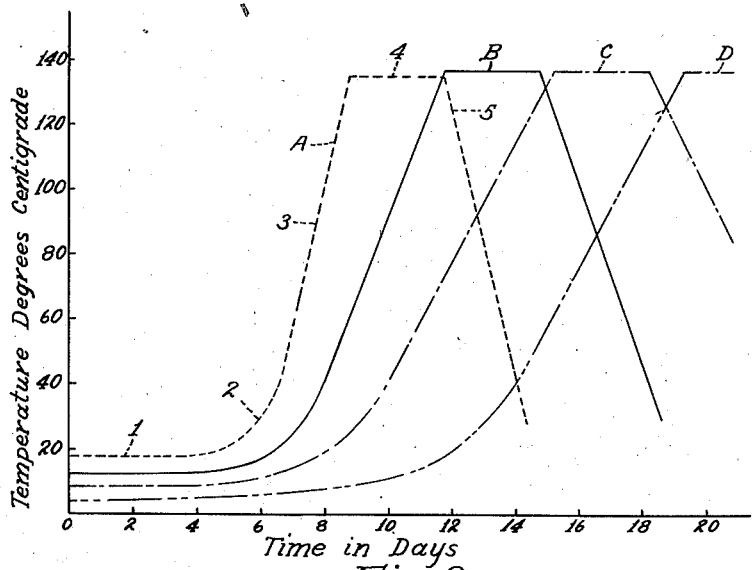

Other objects of the invention will, in part, be obvious and will, in part, appear hereinafter. For a better understanding of the nature and objects of the invention, reference should be had to the following detailed description and drawing, in which:

Figure 1 is a vertical cross section through an apparatus for polymerizing resins in accordance with the invention; and Fig. 2 is a graph plotting temperatures against time for the polymerization of resins.

The present invention relates to the process and the product obtained by polymerizing certain thermosettable liquid compositions into large bodies which are unusually homogeneous and isotropic so that they may be applied for photoelastic studies. In particular, this invention relates to the polymerization of compositions embodying akyd resins dissolved in liquid monomers having the group $H_2C=C<$. Briefly, the alkyd resins are prepared by reacting diethylene glycol with the mixture of saturated and unsaturated dicarboxylic organic acids, the diethylene glycol being slightly in excess of the dicarboxylic acids to an amount not in excess of 10 mole percent. Specifically, the alkyd resin for use in the composition is prepared by reacting 23.3 moles diethylene glycol and from 21 to 23.3 moles of a mixture of saturated and unsaturated dicarboxylic acids. The unsaturated dicarboxylic acids are composed of either maleic acid or fumaric acids or mixtures or both, and the saturated dicarboxylic acids are sebacic acid or adipic acid or mixtures of both acids in an amount equal to from 25 to 50 mole per cent of the total acids. A particularly desirable alkyd resin for photoelastic studies was composed of 23.3 moles of diethylene glycol, 7.125 moles of sebacic acid, and 15.9 moles of maleic acid. The anhydrides of the acids cannot be employed since they result in unannealable, mottled polymers when examined under polarized light. Approximately one-tenth of the moles of diethylene glycol may be replaced with aliphatic glycols having no other functional group than the hydroxyl groups. Examples of such glycols are ethylene glycol, 1,3-propylene glycol, 1,2-propylene glycol, triethylene glycol, and dipropylene glycol. The adkyd resin so produced is dissolved in a liquid monomer having the group $H_2C=C<$ particularly good results having been obtained by employing monostyrene as the solvent for the alkyd resin. The monostyrene has been employed in the proportions of from 34% to 74% of the total solution. The mixture should be thoroughly mixed to secure a homogeneous solution.

The present process may be applied to other polymerizable compositions with or without polymerization catalysts, since the process will produce large, sound blocks of resin that are free from cracks and flaws that are suitable for many other applications. For example, the process may be applied to polymerize solutions of alkyd resins having unsaturated groups capable of vinyl polymerization dissolved in liquid monomers having the group $H_2C=C<$. Examples of the monomers are monostyrene, vinyl acetate, vinyl chloride, allyl alcohol, ethyl acrylate, diallyl phthalate, methyl methacrylate and acrylonitrile. Example of alkyd resins suitable for copolymerization with the monomers having the group H₂C= are castor oil maleates, propylene glycol fumarate and ethylene glycol maleate.

In preparing the alkyd resin, the following reaction procedure employing a successful formulation is preferred.

*Example A*

A reaction vessel is charged with 23.3 moles of diethylene glycol, 7⅛ moles of sebacic acid and 15.92 moles of maleic acid. The reaction vessel is provided with a stirrer, temperature indicating means, an air condenser and means for sparging with an inert gas. The reaction vessel is heated so that the temperature rises at the rate of 100° C. per hour, although a slower rate of heating or a slightly greater rate of heating may be applied. The flow of inert gas such as nitrogen, hydrogen and carbon dioxide is started immediately after the vessel is charged with the reactants. The air condenser is permitted to operate until the temperature in the reaction vessel reaches about 180° C. at which time it is removed to permit a more rapid escape of the water evolved in the reaction. The reaction is maintained at a maximum temperature of from 180° C. to 220° C. The reaction is continued at this maximum temperature for from eight to twelve hours until the resinous reaction product has an acid number of from twenty to sixty. The resin at this time is of a straw yellow color and of a heavy syrup consistency. No volatile organic solvent is added to the resin.

The alkyd resin so produced is cooled to room temperature and then thoroughly admixed with monostyrene in the proportion of from 34% to 74% by weight of styrene and 66% to 26% by weight of the alkyd resin. The monostyrene will dissolve the alkyd resin and a homogeneous solution will result. The solution is preferably polymerized soon after having been prepared.

In polymerizing any of the liquid compositions, in accordance with the present invention, they are admixed, while at room temperature or lower, preferably 20° C. or below, with from 0.1% to 2% of their weight of a soluble polymerization catalyst. Peroxides are particularly good catalysts for this purpose. Excellent results have been obtained by using 1% of tertiary butyl perbenzoate. Benzoyl peroxide, ascaridole di-t-butyl peroxide, and other catalysts for causing vinyl type polymerization of the liquid compositions may be employed. The catalyst should preferably dissolve in the composition in order to secure a uniform distribution therein. The composition with the dissolved catalyst is filtered to remove any possible undissolved matter and kept cool.

It is critical that the walls of the container in which the composition is to be polymerized be composed of a material inert to the composition and to which the solid polymer does not adhere. We have found glass to be particularly suitable. Containers of polyethylene or polytetrafluoroethylene also are suitable for retaining the composition while it is being polymerized.

No metal or rubber container has been found satisfactory for polymerizing the compositions therein because adhesion or reaction takes place between the metal or rubber and the composition. Solid glass containers or containers of other materials whose walls have been coated with glass have proven most effective.

A container of glass or polyethylene of round cylindrical shape is ordinarily preferred for carrying out of the polymerization since such a shape is easy to construct. However square cross-sectioned or other convex polygonal cylinders can be employed. We have prepared glass parallelepiped containers 5 inches deep by 12 inches wide by 18 inches long in which the compositions are polymerized. When we refer to the diameter of a container hereafter, it applies to other convex shapes than round cylinders as the minimum or least major dimension, such as width or depth.

The composition with dissolved catalyst should be kept substantially in the dark away from actinic or photocatalytic light. It has been found that polymerization induced by radiation is non-uniform and detrimental to the quality of the product.

Referring to Fig. 1 of the drawing there is illustrated an apparatus for conducting the polymerization in accordance with the invention. A glass container 10 is filled with the polymerizable liquid composition 8 containing the dissolved catalyst therein. The container is provided with two inlet tubes 12 through one of which the composition 8 has been introduced into the container 10. The other tube 12 permits the escape of air as the composition is being introduced into the container. In some cases, it has been found desirable to apply a slight vacuum to the other tube 12 as the composition is being introduced in order to assist in removing any moisture and oxygen that may be present or that may tend to be entrapped in the form of bubbles or the like in the composition. The tubes 12 are preferably filled almost completely with the composition 8 and then the ends are sealed. Fusion of the tubes 12 or applying an air tight elastomeric cork or resin cap has effected a satisfactory hermetical seal. It is desirable that the polymerization be carried out in the absence of oxygen and moisture.

The container 10 with its contents rests on supports 14 inside of an insulated cabinet 16. An insulating cover 18 on the cabinet isolates the interior from exterior light and heat. The interior of the cabinet 16 is filled with a liquid 20, such as water, oil or the like capable of equalizing the temperatures around the container 10 and keeping a constant predetermined temperature. Since a close control of temperature is necessary, air has not been found a suitable ambient medium in the cabinet 16 in the critical temperature range of from 5° C. to 40° C. Above 40° C. the use of air or the like is adequate. A cooling coil 22 is disposed within the container 16 in order to cool the fluid 20 and the container 10 with its contents to a predetermined temperature. The coil 22 may be supplied with a refrigerant through the inlet and outlet terminals 24 and 26 thereof. The fluid 20 is also in contact with the heating element 28, for example, a resistance element which is provided with electrical current through the terminals 30. An extremely precise control of temperature has been found necessary in order to maintain certain temperature conditions within the container 10 and suitable thermostatic controls for this purpose are available and are preferably employed.

The composition 8 within the container 10 is cooled rapidly after the catalyst has been dissolved to a predetermined low temperature depending on the relative diameter of the container 10 and kept at such temperature for four days. It has been found that the diameter of the container exercises an important effect on the polymerization of the body of the composition. The temperature must be maintained within the limits of 5° C. to 18° C. The temperature within this range is related to the interior diameter of the glass container 10 by the empirical equation.

$$T°C. = 50/D$$

where D is the internal diameter in inches of the glass container and D has a value of from 10 inches to 3 inches. For non-cylindrical convex containers D is the least major internal dimension. Containers of a diameter of 10 inches and greater should be maintained at 5° C. while containers of less than 3 inches in diameter are maintained at a temperature not exceeding 18° C. The temperatures are quite critical and a departure of more than one or two degrees centigrade from these values has either resulted in unsatisfactory bodies for photoelastic studies or else the reaction fails to proceed. After being maintained for 4 days at the indicated low temperatures, it will be found that the composition 8 has gelled and become viscous, but is still fluid. Thereafter, the temperature is raised slowly at a gradually increasing rate so that a temperature of 40° C. is reached in approximately the same number of days as the number of inches of internal diameter of the container 10. At this time the water or oil 20 may be removed and the container 10 may be heated while surrounded with air.

Referring to Fig. 2 of the drawing there is illustrated a series of curves A, B, C and D correlating the temperatures and time in days required for carrying out the polymerization of the compositions 8 in glass containers having internal diameters 3, 4, 6 and 10 inches respectively. The curves have been five distinct parts designated as:

1. The initial 4 day low temperature dwell period;
2. Temperature rise at an increasing rate;
3. A uniform rate of temperature increase;
4. A high temperature dwell period, and
5. A uniform slow cooling to room temperature.

It will be noted that in part 1 of curve A, for instance, the temperature is maintained at 17° C. for about 4 days, then in part 2 the temperature is gradually increased so that between the 6th and 7th day, it has reached a temperature of 40° C. For a 6 inch diameter glass container shown in curve C, the 40° C. temperature is reached in 6 days or a total time of 10 days from the initiation of the polymerization. The rate of temperature rise is maintained constant from 40° C. until a temperature of from 110° C. to 160° C. has been reached. Short times with adequate control are most readily secured in the range from 120° C. to 150° C. and for this reason this range is preferable. The rate at which the temperature increases should not be in excess of ¾° C. per hour for glass containers of 10 inches diameter and greater, preferably at about ½° C. per hour. The rate may be increased in inverse proportion to the diameter of the glass container to a maximum of 2° C. per hour for glass containers of 3 inches internal diameter and less. As shown in Fig. 2, the temperatures at part 4 were permitted to rise to approximately 135° C. and were maintained at this selected temperature for approximately 3 days. At these elevated temperatures the resin is fully cured into a hard body that is homogeneous and isotropic. The composition 8 is held at the maximum temperature at part 4 for a period of time inversely proportional to the temperatures. Thus at 150° C. 1 day is suggested while at 120° C., 4 days is required. While the maximum temperatures need not be held constant but may be varied, the operating difficulties involved render it preferable not to change the maximum temperatures.

After having been polymerized at the elevated temperatures, the resin solid produced within the container 10 will be found to have shrunk substantially and it will be free from adherence to the walls of the container. A considerable vacuum is present within the container 10 due to such shrinkage.

In order to avoid introducing any thermal strains, cracks, or flaws within the body of resin produced by the polymerization of composition 8 in this manner, the container 10 is cooled gradually as indicated at part 5 of the curve to room temperature. Cooling at the same rate as the temperature rise rate in part 3 has been found to give good results in practice. Several days' gradual cooling is required to reach room temperature. Such slow cooling will result in a resin body that is free from mottling or any other indication of heterogeneous stresses and having no cracks or other undesirable features.

Flawless members suitable for photoelastic studies and weighing over 30 pounds have been produced by this process in less than one month, the diameter being six inches and the length thirty inches. Members of this size have not been available heretofore for photoelastic investigations.

The utility of the present composition for photoelastic analysis is controlled by the components and their proportions, as set forth herein, which have been found to be extremely critical. The complete substitution of ethylene glycol for diethylene glycol, for example, produces a product that is inferior photoelastically and has very poor machinability and is characterized by unannealable mottling. The use of other acids than adipic acid or sebacic acid results in incompatible compositions which are entirely worthless for the purposes of this invention.

We have produced a great number of bodies of the solid resin of the composition of this invention and found them unusually superior for photoelastic uses. The examples in the table are typical satisfactory formulations:

Table

| No. | Alkyd Resin Composition | Moles | Per cent Monostyrene |
|---|---|---|---|
| 1 | diethylene glycol | 23.3 | 54 |
|   | adipic acid | 8.91 |  |
|   | maleic acid | 13.27 |  |
| 2 | diethylene glycol | 23.3 | 49 |
|   | adipic acid | 10.6 |  |
|   | maleic acid | 10.6 |  |
| 3 | diethylene glycol | 23.3 | 54 |
|   | adipic acid | 10.6 |  |
|   | maleic acid | 10.6 |  |
| 4 | diethylene glycol | 23.3 | 58 |
|   | adipic acid | 10.6 |  |
|   | maleic acid | 10.6 |  |
| 5 | diethylene glycol | 23.3 | 34 |
|   | sebacic acid | 9.42 |  |
|   | maleic acid | 13.63 |  |
| 6 | diethylene glycol | 23.3 | 54 |
|   | sebacic acid | 9.42 |  |
|   | maleic acid | 13.63 |  |
| 7 | diethylene glycol | 23.3 | 34 |
|   | sebacic acid | 5.53 |  |
|   | maleic acid | 17.50 |  |
| 8 | diethylene glycol | 23.3 | 54 |
|   | sebacic acid | 5.53 |  |
|   | maleic acid | 17.50 |  |
| 9 | diethylene glycol | 23.3 | 74 |
|   | sebacic acid | 5.53 |  |
|   | maleic acid | 17.50 |  |
| 10 | diethylene glycol | 23.3 | 54 |
|   | sebacic acid | 7.12 |  |
|   | fumaric acid | 15.9 |  |

The fringe value and the modulus of elasticity of the compositions increase as the proportion of alkyd resin in the composition increases. A 35% monostyrene–65% alkyd resin composition has a higher fringe value and higher modulus than compositions having more monostyrene. For this reason, lower monostyrene content compositions may be preferred. The compositions have been found to have a linear relationship between stress in pounds per square inch and the fringe order up to approximately fifty fringes per inch thickness of material.

The figure of merit, Q, as defined previously, for the compositions of this invention is 50% to 100% greater than for the best previously known photoelastic material.

A further desirable property which is unique for the resins of this invention, is that no time-edge effect stresses are produced. Previous materials have been found not to be stable and show time-edge effect stresses. This property shows itself by fringe patterns developing in an unloaded piece with passage of time, or the shifting of a fringe pattern in a "frozen stress" test member. Heretofore, test members had to be examined within 24 hours after the load stress was applied otherwise they changed so much that they were unusable. By contrast, the resinous compositions of this invention do not develop fringe patterns in unstressed pieces on standing even for long periods of time. Stressed models retain the fringe pattern for months without any observable change.

Since certain obvious changes may be made in the above procedures and different embodiments of the invention could be made without departing from the scope thereof, it is intended that all matter contained in the above-description or taken in connection with the accompanying drawing, shall be interpreted as illustrative and not in a limiting sense.

We claim as our invention:

1. In the process of polymerizing a relatively large body of a completely polymerizable thermosetting liquid composition into a homogeneous solid, the liquid composition composed of an alkyd resin which is a polyester of a polyhydric alcohol and an alpha, beta-ethylenically unsaturated dicarboxylic acid and a liquid polymerizable monomer having the group $H_2C=C<$, the steps comprising dissolving a polymerization catalyst composed of an organic peroxide in the liquid composition, placing the catalyzed liquid composition in a convex cylindrical glass container to substantially fill it, sealing the container against entry of atmospheric gases and moisture, maintaining the glass container and the catalyzed composition therein at a temperature of between 5° C. and 18° C. in the substantial absence of photo-catalytic light, the temperature being related to the internal dimensions of the glass container by the empirical equation $$T° C.=50/D$$

where D is the least major internal dimension of the glass container, D having a value of from 10 inches to 3 inches, containers where D has a value of 10 inches and greater being maintained at 5° C. and containers with D less than 3 inches being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for containers where D is 10 inches and over, and not in excess of 2° C. per hour for containers where D is 3 inches and less, the maximum rate of temperature rise between these values being inversely proportional to the values for D, to an elevated temperature of from 110° C. to 160° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

2. In the process of polymerizing a relatively large body of a completely polymerizable liquid composition composed of a solution of an alkyd resin which is a polyester of a polyhydric alcohol and an alpha, beta-ethylenically unsaturated dicarboxylic acid and a liquid polymerizable monomer having the group $H_2C=C<$, into a homogeneous solid, the steps comprising dissolving a peroxide catalyst as the sole catalyst in the composition in an amount of from 0.1% to 2% of the weight of the composition, placing the catalyzed composition in a convex cylindrical glass container to substantially fill it, sealing the container against entry of atmospheric gases and moisture, reducing the temperature of the composition to between 5° C. and 18° C. in the absence of photo-catalytic light, the temperature being related to the internal dimensions of the glass container by the empirical equation $$T° C.=50/D$$

where D is the least major internal dimension of the glass container, D having a value of from 10 inches to 3 inches, containers where D has a value of 10 inches and greater being maintained at 5° C. and containers with D less than 3 inches being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for containers where D is 10 inches and over, and not in excess of 2° C. per hour for containers where D is 3 inches and less, the maximum rate of temperature rise between these values being inversely proportional to the values for D, to an elevated temperature of from 120° C. to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

3. In the process of polymerizing a relatively large body of a completely polymerizable liquid composition composed of a solution of a diethylene glycol-maleic acid-sebacic acid resin and monostyrene into a homogeneous solid, the steps comprising dissolving a peroxide catalyst as the sole catalyst in the composition in an amount of from 0.1% to 2% of the weight of the composition, placing the catalyzed composition in a cylindrical glass container to substantially fill it, sealing the container against entry of atmospheric gases and moisture, reducing the temperature of the composition to between 5° C. and 18° C. in the absence of photo-catalytic light, the temperature being related to the internal dimensions of the glass container by the empirical equation $$T° C.=50/D$$

where D is the least major internal dimension of the glass container, D having a value of from 10 inches to 3 inches, containers where D has a value of 10 inches and greater being maintained at 5° C. and containers with D less than 3 inches being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for containers where D is 10 inches and over, and not in excess of 2° C. per hour for containers where D is 3 inches and less, the maximum rate of temperature rise between these values being inversely proportional to the values for D, to an elevated temperature of from 120° to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

4. In the process of polymerizing a relatively large body of a completely polymerizable thermosetting liquid composition into a homogeneous solid, the liquid composition composed of an alkyd resin which is a polyester of a polyhydric alcohol and an alpha, beta-ethylenically unsaturated dicarboxylic acid and a liquid polymerizable monomer having the group $H_2C=C<$, the steps comprising dissolving a polymerization catalyst composed of organic peroxide in the liquid composition, placing the catalyzed liquid composition in a container of a convex cylindrical shape to substantially fill it, the container having the surfaces in contact with the compositions composed of a material inert to the composition and to which the polymer does not adhere, sealing the container against entry of atmospheric gases and moisture, maintaining the container and the catalyzed composition therein at a temperature of between 5° C. and 18° C. in the substantial absence of photo-catalytic light, the temperature being related to the internal dimensions of the container by the empirical equation $$T° C.=50/D$$

where D is the least major internal dimension of the container, D having a value of from 10 inches to 3 inches, containers where D has a value of 10 inches and greater being maintained at 5° C. and containers with D less than 3 inches being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for containers where D is 10 inches and over, and not in excess of 2° C. per hour for containers where D is 3 inches and less, the maximum rate of temperature rise between these values being inversely proportional to the values for D, to an elevated temperature of from 110° C. to 160° C., and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

5. In the process of polymerizing a relatively large body of a completely polymerizable liquid composition composed of a solution of a diethylene glycol-maleic acid-sebacic acid resin and monostyrene into a homogeneous solid, the steps comprising dissolving a peroxide catalyst as the sole catalyst in the composition in an amount of from 0.1% to 2% of the weight of the composition, placing the catalyzed composition in a convex cylindrical glass container to substantially fill it, sealing the container against entry of atmospheric gases and moisture to the composition, reducing the temperature of the composition to between 5° C. and 18° C. in the absence of photo-catalytic light, the temperature being related to the internal dimension of the glass container by the empirical equation $$T° C.=50/D$$

where D is the least major internal dimension of the glass container, D having a value of from 10 inches to 3 inches, containers where D has a value of 10 inches and greater being maintained at 5° C. and containers with D less than 3 inches being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for containers where D is 10 inches and over, and not in excess of 2° C. per hour for containers where D is 3 inches and less, the maximum rate of temperature rise between these values being inversely proportional to the values for D, to an elevated temperature of 135° C., holding at this elevated temperature for approximately 3 days, until the liquid composition has been fully polymerized into a homogeneous resin solid, and slowly cooling the solid to room temperature at a rate preventing stresses being set up in the resin solid.

6. A photoelastic member consisting of a solid, transparent, homogeneous resinous composition composed of the copolymer of from 34 to 74 parts by weight of monostyrene and from 66 to 26 parts by weight of the alkyd resin derived by reacting 23.3 moles of diethylene glycol and from 21 to 23.3 moles of a mixture of saturated and unsaturated dicarboxylic acids, the unsaturated acids consisting of at least one acid from the group consisting of maleic acid and fumaric acid, and the saturated acid being selected from the group consisting of adipic acid and sebacic acid, the saturated acids constituting from 25 to 50 molepercent of all the dicarboxylic acids, the reaction being carried out at a gradually increasing temperature until a maximum temperature of from 180° C. to 220° C. is reached and maintained at this maximum temperature until an acid number of from 20 to 60 is attained, the solid copolymer being derived by dissolving a peroxide catalyst as the sole catalyst in an amount of from 0.1% to 2% of the total weight of the monostyrene and alkyd resin, placing the catalyzed composition in a cylindrical glass container to substantially fill it, sealing the container against entry of atmospheric gases and moisture, reducing the temperature of the composition to between 5° C. and 18° C. in the absence of photo-catalytic light, the temperature being related to the internal dimensions of the glass container by the empirical equation $$T° C.=50/D$$

where D is the least major internal dimension of the glass container, D having a value of from 10 inches to 3 inches, containers with D 10 inches and greater being maintained at 5° C. and containers less than 3 inches for D being maintained at a temperature not exceeding 18° C., the containers being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for glass containers where D is 10 inches and over, and not in excess of 2° C. per hour for containers where D is 3 inches and less, the maximum rate of temperature rise being proportioned between these limits inversely to D for values thereof between 3 inches and 10 inches, to an elevated temperature of from 120° C. to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

7. A member suitable for photoelastic studies consisting of a solid, transparent, homogeneous resinous composition composed of the copolymer of from 34 to 74 parts by weight of monostyrene and from 66 to 26 parts by weight of the alkyd resin derived by reacting a mixture of 21 to 23.3 moles of diethylene glycol and up to 2.3 moles of another aliphatic glycol having no other functional group than the hydroxyl groups, and from 21 to 23.3 moles of a mixture of saturated and unsaturated dicarboxylic acids, the unsaturated acids consisting of at least one acid selected from the group consisting of maleic acid and fumaric acid, and the saturated acid being selected from the group consisting of adipic acid and sebacic acid, the saturated acids constituting from 25 to 50 mole-percent of all the dicarboxylic acids, the reaction being carried out at a gradually increasing temperature until a maximum temperature of from 180° C. to 220° C. is reached and maintained at this maximum temperature until an acid number of from 20 to 60 is attained, the solid copolymer being derived by dissolving a peroxide catalyst as the sole catalyst in an amount of from 0.1% to 2% of the total weight of the monostyrene and alkyd resin, placing the catalyzed composition in a cylindrical glass container to substantially fill it, sealing the container against entry of atmospheric gases and moisture, reducing the temperature of the composition to between 5° C. and 18° C. in the absence of photocatalytic light, the temperature being related to the internal dimensions of the glass container by the empirical equation $$T° C.=50/D$$

where D is the least major internal dimension of the glass container, D having a value of from 10 inches to 3 inches, containers with D 10 inches and greater being maintained at 5° C. and containers less than 3 inches for D being maintained at a temperature not exceeding 18° C., the container being maintained at the temperatures indicated for at least 4 days, then the temperature being slowly raised at a gradually increasing rate so that a temperature of 40° C. is reached in approximately the same number of days as the number of inches for D, but in not less than two days, then raising the temperature at a constant rate from 40° C., but not in excess of ¾° C. per hour for glass containers where D is 10 inches and over, and not in excess of 2° C. per hour for containers where D is 3 inches and less, the maximum rate of temperature rise being proportioned between these limits inversely to D for values thereof between 3 inches and 10 inches, to an elevated temperature of from 120° C. to 150° C. and holding at the elevated temperature for at least from 4 to 1 days, the longer times being employed at the lower temperature, until the liquid composition has been fully polymerized into a homogeneous resin solid, and slowly cooling the solid to room temperature at a rate preventing stresses being set up in the resin solid.

8. A member suitable for photoelastic studies consisting of a transparent, homogeneous solid resinous polymer comprising the reaction product of (a) 54 parts by weight of monostyrene, and (b) 46 parts by weight of the ester derived by reacting 23.3 moles of diethylene glycol, 7⅛ moles of sebacic acid and 15.9 moles maleic acid at a temperature of 200° C. to an acid number of from 20 to 60.

9. A member suitable for photoelastic studies consisting of a transparent, homogeneous solid resinous polymer composed of the reaction product of (a) 54 parts by weight of monostyrene, and (b) 46 parts by weight of the ester derived by reacting 23.3 moles of diethylene glycol, 7.12 moles of sebacic acid and 15.9 moles of fumaric acid reacted at a temperature of from 180° C. to 220° C. to an acid number of from 20 to 60.

HERBERT F. MINTER.
NEWTON C. FOSTER.
MILTON M. LEVEN.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,451,935 | Foster | Oct. 19, 1946 |
| 2,453,665 | Kropa | Nov. 9, 1948 |
| 2,453,666 | Kropa | Nov. 9, 1948 |
| 2,467,527 | Harris | Apr. 19, 1949 |

OTHER REFERENCES

Rust: Pp. 64–67, Ind. & Eng. Chem., January 1940.

Modern Plastics, October 1947, pp. 11, 114 and 115.

Plastics (of London), pp. 588–592, November 1947.